Sept. 15, 1959  E. C. MEINHOLTZ ET AL  2,904,370
FREIGHT HANDLING EQUIPMENT
Filed Dec. 20, 1956  2 Sheets-Sheet 1
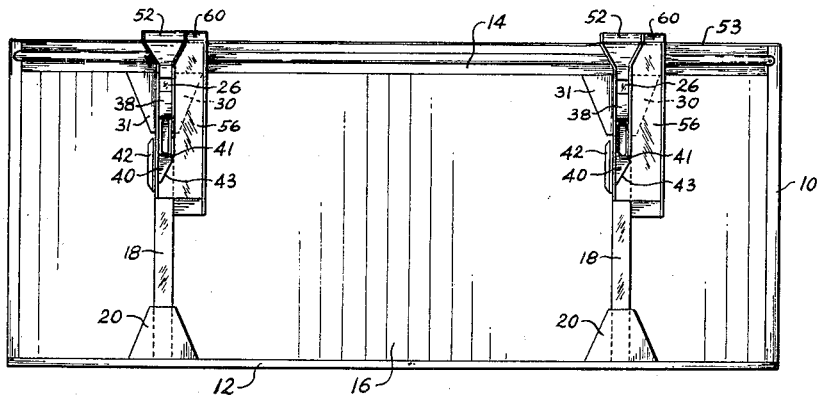
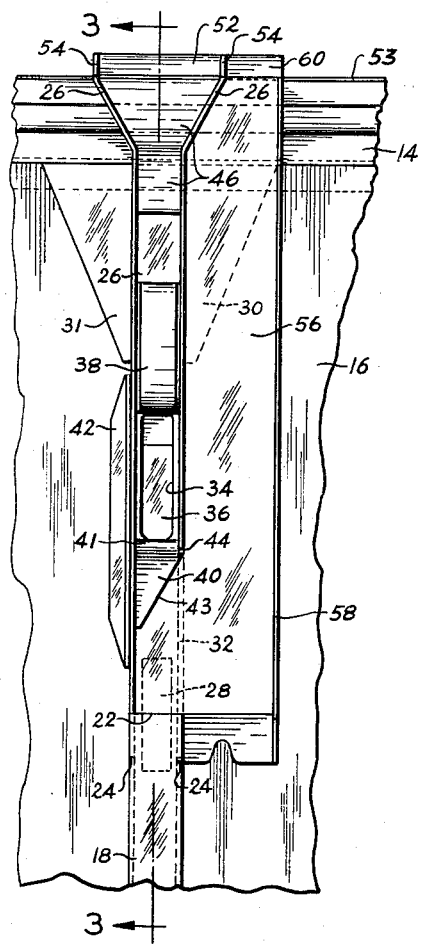
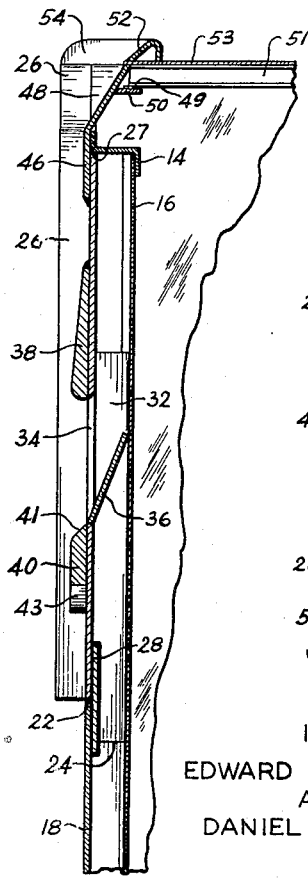
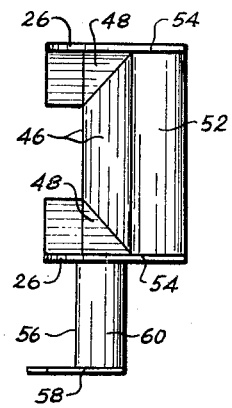
INVENTORS
EDWARD C. MEINHOLTZ
AND
DANIEL MARTIGNON
BY Rey Eilers
ATTORNEY

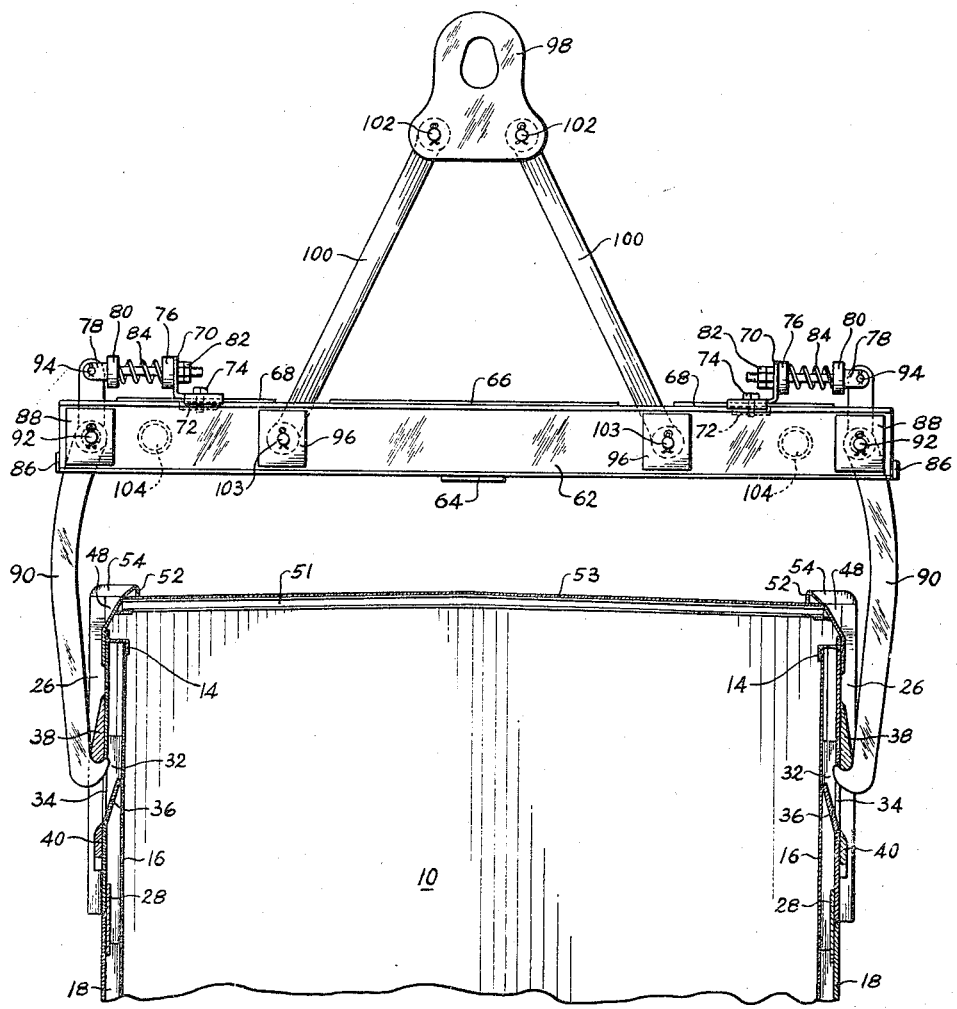

United States Patent Office 2,904,370
Patented Sept. 15, 1959

2,904,370

FREIGHT HANDLING EQUIPMENT

Edward C. Meinholtz and Daniel Martignon,
St. Louis, Mo.

Application December 20, 1956, Serial No. 629,676

6 Claims. (Cl. 294—110)

This invention relates to improvements in freight handling equipment. More particularly, this invention relates to improvements in freight containers which can be transported on railroad cars.

It is therefore an object of the present invention to provide an improved freight container which can be transported on railroad cars.

For a number of years, many over-the-road trucking companies have enjoyed a competitive advantage over railroads, because the shipper's freight could be loaded directly onto the trucks of those companies and not re-handled until it was unloaded at the consignee's dock; whereas if that shipper's freight were to be shipped by a railroad, that freight would have to be loaded onto a truck, re-loaded into a railroad car at the freight depot, loaded onto a truck at the freight depot nearest the consignee, and finally unloaded at the consignee's dock. Two extra "handlings" of the freight were required where that freight was shipped by the railroad, and those extra handlings meant increased labor costs and some loss of time. Further, the extra handlings increased the risk of injury to that freight where that freight was delicate in nature. In an effort to eliminate that competitive advantage, in favor of those trucking companies, a number of railroads have considered different plans, for the shipping of freight, which would eliminate the extra handling of that freight. One such plan calls for the transporting of freight-carrying trucks on railroad flat cars; and that plan possesses the advantage of enabling the trucks to be sent to pick up the freight, to be driven onto the freight cars and locked in position while they are transported to the freight depot nearest the consignee, and to be driven off of the flat cars and then to the consignee's dock. This plan is workable but it is not fully efficient, because the weight of the chassis and engine of each transported truck, and the weight of the chassis of each transported trailer is unproductive weight that must be pulled by the engine and that must be supported by the road bed. That plan is also not fully efficient because it necessitates the purchase or lease of more trucks and tractor-trailers than are needed to pick up and deliver the freight; because the trucks and tractor-trailers which are being transported are wholly unavailable for picking up and delivering freight for substantial periods of time. The present invention utilizes a plan wherein a large freight container is releasably mounted on the chassis of a truck or trailer, is transported to the shipper's dock and then to the freight depot, is bodily lifted from that chassis and set on a railroad car, is transported to the freight depot nearest the consignee, and is then bodily lifted from that railroad car and set on another truck or trailer chassis to be hauled to the consignee's dock. The freight in the freight container is not re-handled from the time it leaves the shipper's dock until it reaches the consignee's dock. The weight of the freight container is considerably less than the weight of a truck or trailer of equal capacity, and the freight container provides such complete protection for the freight that the freight does not have to be placed in a box car; and hence, little or no excess weight is involved. The truck and trailer chassis need not be idle after the freight containers are lifted from them; instead additional freight containers can be mounted on them and used to pick up additional freight. For all these reasons, the provision of freight containers and truck and trailer chassis that releasably carry those containers are desirable.

The freight containers should be large enough and sturdy enough to enable them to accommodate large loads, and they must be capable of being readily lifted up from the chassis of trucks and trailers and of being readily lifted up from flat cars and gondola cars. This lifting must be accomplished with absolute safety, and it should be accomplished with a minimum of personnel. The present invention makes such lifting feasible by providing couplers on a lifting frame and by providing combination coupling and de-coupling devices on the freight containers that coact with those couplers to provide positive and automatic coupling and de-coupling of the lifting frame and the freight container. The lifting frame is mounted on a crane, and it is possible for one man to operate the crane and to couple and de-couple the frame and the freight container. It is therefore an object of the present invention to provide couplers on a lifting frame that can coact with combination coupling and de-coupling devices on freight containers to provide positive and automatic coupling and de-coupling of the lifting frame and the freight containers.

Each of the combination coupling and de-coupling devices of the present invention includes a vertical guideway at one side of the freight container which can receive one of the couplers of the lifting frame; and that guideway will guide the coupler to a socket in the combination coupling and de-coupling device. An abutment on that coupler can enter that socket and help couple the frame and the freight container together. The guideway has a wide entrance, and that entrance minimizes the amount of alining which the craneman must do between the various couplers and the various combination coupling and de-coupling devices. As a result, all the craneman need do is generally aline the couplers on the lifting frame with the guideways on the freight container and then lower the crane downwardly until the couplers are guided into the sockets of the combination coupling and de-coupling devices on the freight container. Thereafter, the crane can be raised upwardly to lift that container off of the truck or trailer chassis or off of the railroad car. It is therefore an object of the present invention to provide combination coupling and de-coupling devices for freight containers which have guideways that can receive couplers and guide the abutments on those couplers to sockets in those devices.

The couplers on the lifting frame and the combination coupling and de-coupling devices on the freight container must be simple to operate and maintain. The couplers and the combination coupling and de-coupling devices provided by the present invention are made with a minimum of moving parts; those combination coupling and de-coupling devices having no moving parts at all, and those couplers being pivoted to the lifting frame and having springs to bias their abutments toward each other. As a result, the couplers and combination coupling and de-coupling devices provided by the present invention are simple to operate and maintain.

The couplers and the combination coupling and de-coupling devices should be capable of operating in all kinds of weather, including icy weather. The couplers provided by the present invention are biased toward each other by stout springs, and the abutments on those couplers are normally held closer together than the distances between the combination coupling and de-coupling devices. As a result, the couplers must be rotated to move their abutments apart as those couplers move into engagement with the combination coupling and de-coupling devices; and that rotation will break any ice that may have formed on the couplers, their pivots or their springs. As a result, the couplers and the combination coupling and de-coupling devices provided by the present invention can be operated in icy and all other kinds of weather.

Each of the combination coupling and de-coupling devices provided by the present invention has a tapered plate and has a socket adjacent the lower end of that tapered plate. That plate performs two functions: first, it strengthens the combination coupling and de-coupling device and enables that device to withstand the heavy forces applied to it; and second, it forces the abutment on the coupler engaging that device to move still farther from its companion coupler. As a result, when the abutment on that coupler moves down below the bottom of that tapered plate, that abutment can snap into the socket, thereby assuring positive coupling and also generating a plainly audible sound. The resulting positive coupling of the coupler and the combination coupling and de-coupling device is very desirable; and the plainly audible sound is very desirable, because it enables the craneman to know when that coupler has fully seated its abutment in the socket. Each of the four couplers on the lifting frame generates its own plainly audible sound, and as soon as the craneman hears the four sounds he knows the four couplers are fully seated, even though two of those couplers are hidden from his view by the freight container. It is therefore an object of the present invention to provide a combination coupling and de-coupling device on a freight container with a tapered plate immediately adjacent the upper edge of a socket.

The tapered plate is disposed within a generally vertical channel; and once the abutment of a coupler has entered the upper end of that channel, the flanges of that channel will confine that abutment and guide it into engagement with the tapered plate. As a result, the craneman need only aline the couplers of the lifting frame with the channels of the combination coupling and de-coupling devices to insure the lodgment of the abutments of those couplers in the sockets of those devices. In the absence of the restraint supplied by the flanges, the couplers could tend to shift out of register with the sockets. It is therefore an object of the present invention to dispose the tapered plates of combination coupling and de-coupling devices between the flanges of channels and to have those flanges guide couplers toward those tapered plates and the sockets therebelow.

The present invention provides a de-coupling block below, and in register with, the socket of each of the combination coupling and de-coupling devices on the freight container. That de-coupling block has an upper face that inclines outwardly and downwardly from the lower edge of the socket to force the abutment of the coupler to move outwardly; and that outward movement will occur automatically whenever the coupler is lowered downwardly below the level of the socket of the combination coupling and de-coupling device. The abutment will move inwardly with a snap as it passes below the bottom face of the de-coupling block. That bottom face is inclined, and it will receive the abutment on the coupler, as that coupler is moved upwardly by the lifting frame; and that bottom face will direct the abutment of that coupler to one side of, and out of register with, the channel which guided that abutment to the socket. A de-coupling channel is adjacent the upper end of the bottom face of the de-coupling block, and that channel will guide the abutment on the coupler past the socket in the coupling channel. In this way, the abutments of the couplers, which were directly guided to the sockets during the coupling operation are directly guided away from those sockets during the de-coupling operation.

As the abutment on the coupler snaps inwardly when it passes below the bottom face of the de-coupling block, it makes a plainly audible sound. That sound indicates to the craneman that the coupler has freed itself from the socket, and further that the abutment of that coupler is below the inclined bottom face of the de-coupler block and will be guided to the de-coupling channel by that bottom face when that coupler is raised upwardly. Similar audible sounds will be provided by the other couplers, and hence an audible indication will be given to the craneman when the lifting frame is in position to be raised upwardly. That audible indication is desirable because it enables the craneman to raise the lifting frame forthrightly instead of "inching" that frame up until the couplers "catch" or can be seen above the level of the top of the freight container. In addition the couplers are made long, and hence when the lifting frame is lowered down onto the combination coupling and de-coupling devices, the craneman has visual proof that the couplers have freed themselves from the sockets.

The abutments on the couplers are guided and confined by the coupling channels of the combination coupling and de-coupling devices as those couplers are lowered toward coupling position, and those abutments are guided and confined by the de-coupling channels of those devices as those couplers are raised out of engagement with those devices. As a result, the couplers are held out of contact or engagement with the sides of the freight container itself. This is desirable since it frees that freight container from any marring or scratching that the couplers would cause if those couplers engaged those sides.

The socket in the combination coupling and de-coupling device of the present invention is an opening in the web of the coupling channel, and that web is spaced a short distance outwardly of the adjacent side wall of the freight container. That spacing makes it possible for the abutment on the coupler to enter, and fully seat in, the socket. An inclined plate is mounted between the web of the coupling channel and the side wall of the freight container, and that plate extends upwardly and inwardly from the bottom edge of the socket. As a result, that inclined plate will cause the abutment on the coupler to move out of the socket as that coupler is lowered downwardly below the level of that socket. In this way, the present invention keeps the abutment from "hanging" in the socket.

The combination coupling and de-coupling devices provided by the persent invention are wholly exterior of the freight container, and hence they do not abstruct, or reduce the effective use of, the interior of that container. Consequently large objects, substantially as large as the opening defined by the doors of the freight container, can be placed within and transported by that container. Further, the combination coupling and de-coupling devices provided by the present invention do not extend very far above the level of the roof of the freight container, and hence they do not require an appreciable reduction in the overall height of that container.

The lifting frame provided by the present invention can be raised and lowered by cranes of standard and usual construction, as for example, gauntry cranes; and that frame does not require lines or cables in addition to the standard lines and cables on those cranes. The coupling and de-coupling of the lifting frame and the freight container do not require any unusual operations of the cranes, and hence the use of the structure provided by the present invention is direct, straightforward and simple.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing,

Fig. 1 is a side elevational view of a freight container that is made in accordance with the principles and teachings of the present invention, Fig. 2 is a side elevational view, on a larger scale, of one of the four combination coupling and de-coupling devices mounted on the freight container of Fig. 1, Fig. 3 is a sectional view of the combination coupling and de-coupling device shown in Fig. 2, and it is taken along the plane indicated by the line 3—3 in Fig. 2, Fig. 4 is a plan view of the combination coupling and de-coupling device shown in Figs. 2 and 3, and Fig. 5 is a sectional end view of the freight container of Fig. 1, of a lifting frame, and of two of the couplers carried by that frame.

Referring to the drawing in detail, the numeral 10 generally denotes a container for freight and the like which can be fastened to the bed of a truck or trailer or to the bed of a railroad car. Such a container is strongly built and has a lower sill 12 and an upper sill 14 at each side thereof. These sills are spaced apart and are suitably reinforced and strengthened by structural members, not shown, of usual and standard design. Corrugated metal sides 16 extend vertically between, and are secured to, the sills 12 and 14. Access to the interior of the container 10 is provided by doors, not shown, which could be in either of the elongated sides of the container 10, but which will preferably be at one of the ends of that container. Those doors will be of standard and usual construction and are not, per se, a part of the present invention.

The numeral 18 denotes a vertically directed channel which has the flanges thereof abutting the external face of side wall 16 of the container 10 and which has its web facing outwardly and lying in a plane parallel to that side wall. The lower end of that channel is suitably secured, as by welding, to the bottom sill 12 of the container 10. A gusset plate 20 is welded to the web of channel 18 and also to the sill 12 to help provide a rigid and permanent securement between the channel 18 and the sill 12. The upper end of the web of the channel 18 is cut off along a horizontal line indicated by the numeral 22, and the upper ends of the flanges of that channel are cut off along horizontal lines indicated by the numeral 24. As a result, the web of the channel 18 projects upwardly beyond the flanges of that channel.

The numeral 26 denotes a channel which has its web confronting, but spaced outwardly of, the side wall 16 of the container 10, and that channel has its flanges directed away from that side wall. The web of channel 26 lies in the same plane as the web of channel 18 and serves, in effect, as an upward extension of that web. The lower end of the web of the channel 26 actually abuts and rests upon the upper end of the web of the channel 18, and the abutting ends of those webs are welded together. A splicing plate 28 is placed behind the abutting ends of the webs of the channels 18 and 26, and that plate is welded to those webs to help provide a sturdy and permanent connection between the channels 18 and 26.

A gusset plate 30 of generally triangular configuration is welded to the right-hand flange of the channel 26 and is also welded to the upper sill 14 of the container 10. A generally similar gusset plate 31 is welded to the left-hand flange of the channel 26 and to the upper sill 14 of the container 10. In addition, the upper end of the channel 26 is welded to the sill 14. The welding of the gusset plates 30 and 31 to the channel 26 and to the sill 14 coacts with the direct welding of that channel to that sill to provide a rigid and permanent joint between the channel 26 and the sill 14.

Stiff bars 32, which have widths equal to the depths of the flanges of the channel 18, are welded to that face of the web of the channel 26 which confronts the side wall 16 of the container 10. Those bars are parallel to and are alined with the flanges of channel 26, but they are directed oppositely to those flanges. The bars 32 coact with those flanges to give the lower end of the channel 26 a cross section comparable to that of an H-beam. The bars 32 also abut that portion of the web of channel 18 which projects above the upper ends of the flanges of that channel; and those bars are alined with and serve, in effect, as upward extensions of those flanges. In fact, the lower ends of the bars 32 abut and rest upon the upper ends of the flanges of the channel 18. The bars 32 are suitably welded to the web of channel 26, to the web of channel 18 and to the flanges of channel 18. As a result, the bars 32 reinforce the channels 18 and 26 and help make those channels sturdy and rigid. In effect, the bars 32 and the channels 18 and 26 define an elongated vertical channel which has its web facing outwardly at the bottom, which has an intermediate H-shaped section, and which has its flanges facing outwardly at the top; and that channel reenforces the structural elements of the container 10.

The numeral 34 denotes an elongated, vertically directed opening in the web of the channel 26, and that opening is close to the vertical midpoint of the channel 26. The side edges of that opening are spaced short distances inwardly from the inner faces of the flanges of the channel 26 to avoid any need of cutting the arcuate portions between the flanges and the web of that channel. As indicated particularly in Fig. 3, the portion of the web of channel 26 which defines the upper edge of the opening 34 is undercut at an angle. A plate 36 is suitably secured, as by welding, to the portion of the web of channel 26 which defines the lower edge of the opening 34, and that plate is inclined rearwardly from the plane of the web of channel 26. The upper end of the plate 36 will abut and bear against the side wall 16 of the container.

A tapered plate 38, which has a generally triangular cross section, as emphasized particularly in Fig. 3, is welded to the outer face of the web of the channel 26 at a point immediately above the upper edge of the opening 34. The lower end of the plate 38 is rounded, as shown particularly in Fig. 3, to provide a smooth and continuous surface with the undercut upper edge of the opening 34. A filling weld is provided adjacent the upper end of the tapered plate 38, and that weld is ground smooth to provide a smooth tapered joint between the outer face of the web of channel 26 and the outer face of the tapered plate 38.

A generally triangular plate 40 is provided with a face 41 that defines the top of that block and that inclines forwardly and downwardly, all as shown in Fig. 3. The upper rear edge of the face 41 is contiguous with the lower edge of the opening 34 and with the lower edge of the inclined plate 36. The plate 40 has a lower face 43 which inclines upwardly from a point immediately adjacent the left-hand flange of the channel 26 to a point immediately adjacent the outer face of the right-hand flange of that channel. That right-hand flange is cut away, as indicated by the numeral 44; and hence a large, open and unobstructed area is provided in register with and below the level of the block 40. As indicated in Fig. 2, the inclined lower face of the plate 40 extends beyond the inner face of the right-hand flange of that channel and extends all the way to the outer face of that right-hand flange. The right-hand portion of the upper face 41 of the plate 40 is cut away to provide a notch that can receive the lower end of the right-hand flange of the channel 26.

A bar 42 of T-shaped cross section is suitably secured to the left-hand flange of the channel 26, as by welding. That T-shaped bar is elongated, and it extends from a point above the upper edge of the opening 34 to a point below the bottom edge of the triangular plate 40. That bar, plus the splicing plate 28 and the bars 32, fully compensates for the weakness in the channel 26 caused by cutting the opening 34 and by cutting away the lower portion of the right-hand flange of that channel.

The numeral 46 denotes a guide plate having a vertically directed lower portion of generally rectangular configuration, which overlies and is welded to the upper portion of the web of the channel 26, and which fits neatly between the flanges of that channel. The upper portion of guide plate 46 inclines upwardly and rearwardly from the vertical portion of that plate; that upper portion starting at a point immediately above the level of the upper edges of the gusset plates 30 and 31 and extending to a level above the roof of the container 10. The upper portion of the plate 46 is generally trapezoidal in configuration; the upper and lower edges thereof being parallel and the sides thereof diverging outwardly and upwardly at angles of approximately thirty degrees to the vertical. Flanges 48 extend forwardly from the upwardly diverging sides of the upper portion of plate 46, and those flanges are substantially triangular in side elevation, all as shown in Fig. 3. The triangular configuration of the flanges 48 enables the front edges of those flanges to be vertical and to abut the inner faces of the flanges of channel 26. The web of that channel is cut off at a horizontal line indicated by the numeral 27, so that web can fit under the horizontally-directed portion of upper sill 14, but the flanges of that channel extend upwardly beyond that line. The upwardly extending ends of the flanges of the channel 26 are bent to diverge outwardly and upwardly, and those upper ends will have the same inclination that the flanges 48 of guide plate 46 have. When the upper ends of the flanges of channel 26 are welded to the flanges 48 of plate 46, those upper ends become, in effect, forward extensions of the flanges 48. Parts of the roof of the container 10, of the top sill 14, and of a roof beam 51 will be cut away to accommodate the upwardly and rearwardly inclined portion of the plate 46. A filling weld is provided at the lower edge of the vertical portion of guide plate 46, and that weld is ground to provide a smooth taper between the plane of the web of the channel 26 and the forward face of the vertical portion of guide plate 46.

A horizontally-directed attaching plate 50 is provided, and that plate is generally C-shaped in plan. The central portion of that plate has a filler pad 49 atop it, and that central portion and that pad are welded to the underside of the roof beam 51. That central portion and the ends of the attaching plate 50 are welded to the upper portion and to the flanges 48 of the guide plate 46. In this way, the guide plate 46 and the upper ends of the flanges of channel 26 are rigidly secured to the container 10.

An upper guide plate 52 is mounted on the roof 53 of the container 10, and it has an inclined forward face, a vertical rear face and forwardly extending vertical flanges 54. The bottom edges of the flanges 54 extend downwardly a short distance below the bottom edges of the inclined forward face and of the vertical rear face of the upper guide plate 52; that distance being the thickness of the roof 53. Those bottom edges of the flanges 54 abut and are welded to the top edges of the flanges 48 on guide plate 46 and to the upper edges of the flanges of channel 26. The lower edges of the inclined forward face and the vertical rear face of the upper guide plate 52 abut and are welded to the roof 53. The upper end of the inclined portion of the guide plate 46 is immediately adjacent the lower edge of the inclined forward face of the guide plate 52, and it serves, in effect, as a downward extension of that face. Consequently a smooth inclined surface is provided for the coupler as that coupler moves downwardly relative to the combination coupling and de-coupling device.

The numeral 56 denotes an elongated, vertically-directed plate which lies in the plane of the web of channel 26. The left-hand edge of the plate 56 abuts the right-hand edge of channel 26; and the upper left-hand corner of the plate 56 is cut away to accommodate the inclined upper end of the right-hand flange of channel 26. The abutting edges of the channel 26 and of the plate 56 are suitably welded together; and that portion of the resulting joint which is to the right of and below the level of the de-coupling block 40 is ground smooth so that no obstruction or interruption to sideways movement of a coupler is offered by that portion of the joint. The plate 56 is flat and plane as far downward as the bottom edge of the web of the channel 26; and then that plate is bent inwardly until its bottom edge engages the side wall 16. That bottom edge of plate 56 is notched to accommodate a corrugation of the side wall 16. The upper end 60 of the plate 56 extends up to the level of the top of guide plate 52, as shown in Fig. 2, and it inclines rearwardly at about the same inclination as the forward face of that guide plate.

Mounted at right angles to the plate 56, and welded to the right-hand edge of that plate, is a vertically-extending plate 58. The plate 58 extends rearwardly beyond the plate 56 to engage the side wall 16 of the freight container 10, and it also extends forwardly beyond the plate 56 to provide a wall that is slightly wider than the right-hand flange of channel 26; as indicated particularly in Fig. 4. The plate 58 has a notch, not shown, adjacent the upper end of the rear edge thereof, and that notch accommodates the top side 14 of the container 10. The upper end of the plate 58 extends up to the level of the tops of the flanges of channel 26. The plates 56 and 58 coact with the right-hand flange of channel 26 to provide what is, in effect, a channel.

The guide plates 46 and 52, the channel 26, the plates 56 and 58, the opening 34, the tapered plate 38 and the de-coupling block 40 coact to constitute a combination coupling and de-coupling device that has a coupling channel and a de-coupling channel. As indicated by Fig. 1, two such combination coupling and de-coupling devices are mounted adjacent the side wall 16 of the container 10, and two closely similar combination coupling and de-coupling devices are mounted adjacent the side wall 18 of that container. The combination coupling and de-coupling devices at the opposite sides of the container 10 are in register with each other. The principal difference between the combination coupling and de-coupling devices shown in Figs. 1–4 and the combination coupling and de-coupling devices adjacent the side wall 18 is that in the former the channels 26 are on the left of the plates 56, the right-hand flanges of channels 26 are cut away at 44 and the bottom faces of de-coupling blocks 40 incline upwardly from lower left to upper right, while in the latter the channels 26 are on the right of plates 56, the left-hand flanges of channels 26 are cut away at 44 and the bottom faces of de-coupling blocks 40 incline upwardly from lower right to upper left. This arrangement is desirable since it keeps the movement of the couplers, during the de-coupling operation, from skewing the lifting frame.

Referring to Fig. 5, the numeral 62 denotes a beam which is fabricated from two back-to-back channels. This beam is slightly longer than the container 10 is wide. The channels have their webs in confronting relation, but those webs are spaced apart a short distance. A plate 64 is welded to the bottom flanges of the back-to-back channels constituting the beam 62, and that plate holds the bottom edges of those channels fixed relative to each other. A plate 66 and two plates 68 are welded to the upper flanges of those back-to-back channels, and those plates stiffen the beam 62 and hold the upper edges of those channels fixed relative to each other. Plates 86 are welded to the webs and to the bottom flanges of the back-to-back channels of the beam 62 to assist in holding those channels fixed relative to each other. As shown in Fig. 5, the plates 86 are spaced outwardly beyond the plates 68 which are welded to the upper flanges of the channels.

The numeral 70 denotes a bracket which is L-shaped in end elevation and which has the lateral edges of the horizontal portion thereof bent downwardly beyond the edges of the flanges of both the channels constituting the beam 62. The downwardly bent edges of the horizontal portion of bracket 70 hold that bracket against rotation relative to the beam 62. The lifting frame has two beams 62, and each of those beams has two brackets 70. A short and narrow plate 72 is fixedly mounted below each of the brackets 70; and the various plates 72 are disposed between the webs of the channels and below the plates 68. Bolts 74 extend downwardly through slots in the horizontal portions of brackets 70 and through openings in the plates 68 to seat in threaded openings in the plates 72. Those bolts releasably hold the brackets 70 in position relative to the beams 62. Annuli 76 are welded to the vertical portions of the brackets 70, and the annuli of the two brackets 70 on each beam 62 confront, and extend toward, each other.

Four yokes 78 are provided, and each of those yokes has an annulus 80 which telescopes over the threaded shank of that yoke and abuts the outer end of that yoke. The threaded shank of the yoke extends through the annulus 76 and through an opening in the bracket 70. Nuts 82 are threaded onto the outwardly extending end of that shank to hold the yoke in assembled relation with the bracket 70. A helical extension spring 84 telescopes over the shank of the yoke 78 and bears against the annuli 76 and 80. The bolts 74 can be loosened to permit the brackets 70 to be shifted toward or away from each other and thus change the spacing between the confronting couplers 90. The nuts 82 can be shifted on the shanks of yokes 78 to vary the pressure of the springs 84; and that pressure will bias the yokes 78 outwardly away from the brackets 70, but the engagement of the nuts 82 with the brackets 70 prevent unlimited movement of those yokes.

Generally rectangular reinforcing plates 88 are welded to the outer faces of the webs of the back-to-back channels, and those plates are disposed adjacent the opposite ends of those channels. The plates and the channel webs have openings through them and pivots 92 are lodged in those openings. Elongated couplers 90 are rotatably mounted on the pivots 92, and those couplers can rotate relative to the beams 62. The pivots 92 are maintained in position by fasteners, shown in the form of cotter keys. Pins 94 extend through openings in the yokes 78 and through the upper ends of the couplers 90 to interconnect those couplers with those yokes, and hence inward movement of the lower ends of those couplers will be limited by the nuts 82 while outward movement of those lower ends will be resisted by the springs 84. Suitable fasteners, shown in the form of cotter keys, prevent accidental separation of the pins 94 from the yokes 78 and from the couplers 90. The lower ends of the couplers 90 have barb-like abutments which confront and extend toward each other.

A number of rectangular reinforcing plates 96 are welded to the outer faces of the webs of the back-to-back channels of the beams 62; and those plates 96 are disposed inwardly of the reinforcing plates 88. Two eye plates 98 are provided which can be suitably connected to the blocks of blocks and tackles; one eye plate for each beam 62. The eye plates 98 are connected to the beams 62 by connecting rods 100 which are secured to the eye plates 98 by pins 102 and are also secured to the beams 62 by pins 103; the pins 102 extending through registered openings in the eye plates 98 and in the connecting rods 100, and the pins 103 extending through registered openings in the connecting rods 100 and in the reinforcing plates 96 and in the webs of the back-to-back channels. Fasteners, shown in the form of cotter keys, prevent accidental separation of the pins 102 from connecting rods 100 and eye plate 98 and also prevent accidental separation of the pins 103 from the connecting rods 100 and the beams 62.

The two beams 62 are held in rigidly spaced relation by elongated rods 104; and those rods and those beams constitute a lifting frame. The spacing of the beams 62 is such that the four couplers 90 supported by the two beams 62 can be placed in register with the four combination coupling and de-coupling devices mounted on the container 10.

In using the structure provided by the present invention, the eye plates 98 of the lifting frame are suitably secured to the blocks of a suitable liftisg device such as a gauntry crane. That crane will straddle a railroad track and it will be wide enough to accommodate a railroad car and a truck or tractor-trailer in side-by-side relationship. That crane can be operated by an operator standing on the ground adjacent the electrical control box of that crane, and that operator will adjust the lateral and longitudinal position of that crane so the couplers 90 on the lifting frame are generally alined with the channels 26. Actually, the craneman need only aline the couplers 90 with the guide plates 46 and 52 which constitute enlarged entrances for the channels 26.

At this time, the abutments on the couplers 90 will define distances which are shorter than the distances between the outer webs of the channels 26 but which are longer than the distances between th upper ends of the inclined faces of guide plates 52; the brackets 70 having been adjusted relative to beams 62 and pivots 92 to define the former distances. Once the operator has generally alined the couplers 90 with the channels 26, he causes the crane to lower the lifting frame downwardly; and as that frame moves downwardly, the abutments on the couplers 90 will engage the inclined faces of the guide plates 52 or the upper portions of guide plates 46. In either event, those abutments will be subjected to outwardly directed forces and move outwardly as the lifting frame continues to move downwardly. The springs 84 will tend to resist this outward movement of the abutments on the couplers 90, but the weight of the lifting frame will apply downward forces of such magnitude to those couplers that those abtuments will move outwardly and will cause the springs 84 to yield. The continued downward movement of the lifting frame will cause the abutments on couplers 90 to enter the channels 26 and engage the tapered plates 38. Those plates will move the abutments on the couplers 90 even farther outwardly; but when those abutments reach the lowermost portions of the tapered plates 38, the compressed springs 84 will force those abutments to snap into the sockets defined by the openings 34. The springs 84 are quite strong, and they force the couplers 90 to move inwardly with considerable force; and as the abutment on each coupler snaps into position it makes a sound that is plainly audible to the operator of the crane. At this time the operator knows that the plates 38, which serve as sturdy abutments on the combination coupling and de-coupling devices, are overlying the abutments of the couplers; and thereupon he can cause the crane to raise the lifting frame and thus raise the freight container 10. That container, having previously been unlatched from the bed of the railroad car or the bed of the automotive vehicle, can be raised bodily upward and then moved bodily sideward, while in elevated position, until it is above the bed of the automotive vehicle or the bed of the railroad car, as the case may be. The craneman will then cause the crane to lower the lifting frame until the freight container rests upon the bed of the automotive vehicle or the bed of the railroad car, and thereupon suitable latches, not shown, will be set in position to lock the freight container to that bed. Thereafter, the craneman will cause the crane to lower the lifting frame still further; and as he does so the abutments on the couplers 90 will engage the inclined plates 36 and be moved outwardly. Continued downward movement of the lifting frame will cause the abutments on the couplers to engage and be moved still farther outwardly by the inclined faces 41 on the de-coupling blocks 40. Still further downward movement of the lifting frame will move the abutments on the couplers 90 down below the inclined faces 43 of the de-coupling blocks 40; and immediately the springs 84 will force those abutments inwardly against the webs of channels 26. Here again, the force of the springs 84 is sufficient to cause the abutments to generate clearly audible sounds when the abutments slip off of the de-coupling blocks 40 and strike the webs of the channels 26. At this time, the craneman knows that the abutments on the couplers 90 are below the inclined faces 43 of the de-coupling blocks 40, and that he can unhesitatingly raise the lifting frame.

That raising of that frame will pull the abutments of couplers 90 upwardly into engagement with the inclined faces 43 of the de-coupling blocks 40, and those faces will force those abutments to move bodily sideways until they are out of register with the coupling channel 26 and are in register with the de-coupling channel. Thereupon continued raising of the lifting frame will cause the couplers 90 to move upwardly to and beyond the upper end 60 of the plate 56. There will be no opportunities for the couplers 90 to snap back into the openings 34 as those couplers move upwardly, because the right-hand flange of the channel 26 constitutes a complete barrier between the couplers 90 and that opening. As a result, once the de-coupling blocks 40 have shifted the couplers 90 into register with the de-coupling channel, those couplers will be kept from returning to the coupling channel.

The coupling and de-coupling structure provided by the present invention is positive and definite in operation, and it can be operated with complete safety. There is no need for anyone to climb up on the sides of the freight container to set the couplers in position or even to climb up on those sides to see if the couplers have been set in position below the abutments 38, because those couplers automatically snap into position and they generate audible sounds as they do so. Similarly, no one need climb up on the sides of the freight container to unseat the couplers, or even to see that those couplers have been unseated, because those couplers automatically snap off of the lower ends of the de-coupling blocks 40 and generate audible sounds as they do so. The strong springs 84 provide a positive action that forces the couplers 90 into position under the abutments 38, and the barb-like abutments on those couplers coact with the gravitational pull on the freight container 10 to solidly lock the couplers 90 and the abutments 38 against accidental separation.

The structure provided by the present invention is particularly suited for use with freight containers that are releasably securable to the beds of railroad cars or to the beds of trucks and tractor-trailers; but that structure can be used with other objects. Further, while the present drawing and accompanying description have shown and described the use of four couplers and four combination coupling and de-coupling devices, small objects would need only two couplers and devices, and very large objects would need more than four couplers and devices.

Whereas the drawing and accompanying description have shown and described a preferred embodiment of the present invention it should be apparent to those skilled in the art that various changes may be made in the form of the invention without affecting the scope thereof.

What we claim is:

1. A coupling and de-coupling mechanism for a pair of objects that includes a pair of guideways mounted on one of said objects, an abutment and a de-coupling element adjacent the bottom of one of said guideways, said de-coupling device being below the level of said abutment, said de-coupling element having a surface thereon that is transverse of said one guideway and is directed toward the other guideway, a coupler on the other of said objects, said coupler being guided by said one guideway to said abutment, said coupler being movable downwardly into engagement with said de-coupling element and being movable by said surface on said de-coupling element into said other guideway, and a separator between said guideways, said separator holding said coupler out of register and out of engagement with said abutment as said coupler moves upwardly past said abutment.

2. A coupling and de-coupling mechanism for a pair of objects that includes a pair of adjacent vertically directed channels mounted on one of said objects, an abutment and a de-coupling element adjacent the lower end of one of said channels, said de-coupling element having a surface thereon that is transverse of said one guideway and is directed toward the other guideway, said abutment being above the level of said de-coupling device, a socket in the web of said one channel, and a coupler on the other of said objects, said coupler being disposable within said one channel and being movable through said one channel to said abutment and said socket, said socket accommodating an abutment on said coupler when that abutment engages the first said abutment, said coupler being movable downwardly in said guideway into engagement with said de-coupling element and being movable by said surface on said decoupling element into said other channel, said other channel directing said coupler past said abutment as said coupler is moved upwardly in said other channel.

3. An automatic coupling and de-coupling mechanism for a freight container and a lifting frame therefor that comprises a plurality of vertically directed horizontally spaced, inwardly-biased couplers depending downwardly from said lifting frame, a horizontally directed barb-like abutment on each of said couplers adjacent the lower end of each said coupler, a plurality of vertically directed coupling channels on said freight container, an abutment and a de-coupling element in each of said coupling channels, said abutments in said coupling channels being disposed above said de-coupling elements, said abutments being tapered plates with thin upper edges and with thick lower edges, openings in said coupling channels intermediate the lower edges of said abutments and the upper edges of said de-coupling elements, each of said de-coupling elements having a forwardly and downwardly inclined upper face and having a lower face that inclines upwardly toward one of the sides of said de-coupling element, de-coupling channels adjacent said coupling channels and adjacent the upper ends of said inclined lower faces of said de-coupling elements, said abutments in said coupling channels being engageable with said abutments on said inwardly biased couplers to urge said couplers apart as said couplers move downwardly in said coupling channels, said abutments on said couplers being movable toward each other and into position where they underlie said abutments in said coupling channels, said abutments on said couplers having upper surfaces that are exposed and that are inclined to the vertical and engageable with said abutments in said coupling channels to pull said abutments on said couplers toward each other and into holding engagement with said abutments in said coupling channels, said abutments on said couplers extending part way into said openings in said coupling channels to dispose said upper surfaces of said abutments on said couplers in underlying relation to said abutments in said coupling channels, said upper faces of said de-coupling elements being engageable with said abutments on said inwardly biased couplers to move the same apart as said couplers move downwardly in said coupling channels from said openings, said abutments on said couplers thereafter moving downwardly and inwardly toward each other until they underlie said inclined lower faces, said inclined lower faces of said de-coupling elements being engageable with said coupler abutments upon upward movement of said couplers to deflect said couplers out of said coupling channels and into said de-coupling channels, said de-coupling channels including portions guiding said couplers to by-pass said openings and said abutments in said coupling channels, said de-coupling elements being spaced below said abutments in said coupling channels vertical distances greater than the vertical heights of said abutments on said couplers, and springs biasing said abutments on said couplers inwardly toward each other.

4. An automatic coupling and de-coupling mechanism for a freight container and a lifting frame therefor that comprises a plurality of vertically directed and horizontally spaced, inwardly biased couplers depending downwardly from said lifting frame, a horizontally directed abutment on each of said couplers adjacent the lower end of each said coupler, a plurality of vertically directed coupling channels on said freight container, an abutment and a de-coupling element in each of said coupling channels, said abutments in said coupling channels being disposed above said de-coupling elements, each of said de-coupling elements having a forwardly and downwardly inclined upper face and having a lower face that inclines upwardly toward one of the sides of said de-coupling element, de-coupling channels adjacent said coupling channels and adjacent said one side and the upper ends of said inclined lower faces of said de-coupling elements, said abutments in said coupling channels being engageable with said inwardly biased abutments on said couplers to urge said horizontally directed abutments apart as said couplers move downwardly in said coupling channels, said abutments on said couplers being movable toward each other and into a position underlying said abutments in said coupling channels, said abutments on said couplers having upper surfaces that are exposed and that are inclined to the vertical and engageable with said abutments in said coupling channels to pull said abutments on said couplers toward each other and into holding engagement with said abutments in said coupling channels, said upper faces of said de-coupling elements being engageable with said abutments on said inwardly biased couplers to move the same apart as said couplers move downwardly in said coupling channels from said abutments in said coupling channels, said abutments on said couplers thereafter moving downwardly and inwardly until they underlie said inclined lower faces and said inclined lower faces thereafter guiding upward movement of said couplers out of said coupling channels and into said de-coupling channels, said de-coupling channels including portions guiding said couplers to by-pass said abutments in said coupling channels, and springs biasing said abutments on said couplers inwardly toward each other.

5. An automatic coupling and de-coupling mechanism for a freight container and a lifting frame therefor that comprises a plurality of inwardly biased couplers mounted on said lifting frame, an abutment on each of said couplers adjacent the lower end of each said coupler, a plurality of vertically directed guideways on said freight container, an abutment and a de-coupling element on said freight container adjacent each of said guideways, said abutments on said freight container being disposed above said de-coupling elements, each of said de-coupling elements having a lower face that inclines upwardly toward one of the sides of said de-coupling element, said abutments on said freight container being engageable with said abutments on said inwardly biased couplers to move the same apart as said couplers move downwardly, said abutments on said couplers being movable toward each other and into a position underlying said abutments on said freight container, said abutments on said couplers having upper surfaces that are exposed and engageable with said abutments on said freight container to hold said abutments on said freight container, the upper faces of said de-coupling elements being engageable with said abutments on said inwardly biased couplers to move the same apart as said couplers move downwardly from said de-coupling elements, said abutments on said couplers thereafter moving downwardly and inwardly until they underlie said inclined lower faces and said inclined lower faces thereafter guiding upward movement of said couplers out of register with said guideways, wall portions of said guideways being engageable with said couplers to cause the abutments thereof to by-pass said abutments on said freight containers during upward movement of said couplers, said de-coupling elements being spaced below said abutments on said freight container vertical distances greater than the vertical heights of said abutments on said couplers, and springs biasing said abutments on said couplers inwardly toward each other.

6. An automatic coupling and de-coupling mechanism for a plurality of objects that comprises a plurality of horizontally spaced, inwardly biased couplers mounted on one of said objects, an abutment on each of said couplers, a plurality of abutments and de-coupling elements on the other of said objects, said abutments on said other object being disposed above said de-coupling elements, each of said de-coupling elements having a lower face that inclines upwardly toward one of the sides of said de-coupling element, said abutments on said couplers normally being closer together than are said abutments on said other object, said abutments on said couplers having surfaces engageable with surfaces on said abutments on said other object to move said abutments on said inwardly biased couplers further apart as said couplers move downwardly, said abutments on said couplers being movable toward each other and into position where they underlie said abutments on said other object, said abutments on said couplers having upper surfaces that are exposed and engageable with said abutments on said other object to hold said abutments on said other object, said de-coupling elements having surfaces thereon that coact with lower surfaces on said abutments on said couplers to move said abutments on said couplers apart as said couplers move downwardly from said abutments on said other object, said abutments on said couplers being positionable to underlie said inclined lower faces upon downward movement and said inclined lower faces thereafter responding to upward movement of said couplers to guide said couplers out of register with said abutments on said other object, means on the other of said objects to maintain said coupler abutments out of engagement with the plurality of abutments upon upward movement from said de-coupling elements, and springs biasing said abutments on said couplers inwardly toward each other.

References Cited in the file of this patent

UNITED STATES PATENTS

| | | |
|---|---|---|
| 833,469 | Lea | Oct. 16, 1906 |
| 1,485,972 | Fitch | Mar. 24, 1924 |
| 1,736,016 | Rosener | Nov. 19, 1929 |
| 1,802,888 | Fitch | Apr. 28, 1931 |
| 1,975,194 | Courtney | Oct. 2, 1934 |
| 2,047,139 | Fildes | July 7, 1936 |
| 2,084,144 | Showers | July 21, 1936 |
| 2,441,026 | Long | May 4, 1948 |
| 2,457,841 | Smith et al. | Jan. 4, 1949 |